US012081315B2

(12) United States Patent
Jin et al.

(10) Patent No.: US 12,081,315 B2
(45) Date of Patent: Sep. 3, 2024

(54) METHOD FOR QUASI-SYNCHRONOUS CODE DIVISION MULTIPLE ACCESS BASED ON SYNCHRONIZATION CLOCK BY PILOTING

(71) Applicants: PEKING UNIVERSITY, Beijing (CN); BEIJING XINXING WEITONG TECHNOLOGY CO., LTD., Beijing (CN)

(72) Inventors: Ye Jin, Beijing (CN); Guocheng Lv, Beijing (CN); Aimin Liu, Beijing (CN); Mingke Dong, Beijing (CN); Baoji Wang, Beijing (CN); Tao He, Beijing (CN)

(73) Assignees: PEKING UNIVERSITY, Beijing (CN); BEIJING XINXING WEITONG TECHNOLOGY CO., LTD., Beijing (CN)

( * ) Notice: Subject to any disclaimer, the term of this patent is extended or adjusted under 35 U.S.C. 154(b) by 336 days.

(21) Appl. No.: 17/630,931

(22) PCT Filed: Jul. 28, 2020

(86) PCT No.: PCT/CN2020/105101
§ 371 (c)(1),
(2) Date: Jan. 28, 2022

(87) PCT Pub. No.: WO2021/018123
PCT Pub. Date: Feb. 4, 2021

(65) Prior Publication Data
US 2022/0278744 A1 Sep. 1, 2022

(30) Foreign Application Priority Data

Jul. 30, 2019 (CN) .......................... 201910696823.5

(51) Int. Cl.
*H04B 7/185* (2006.01)
*H04B 7/06* (2006.01)
(Continued)

(52) U.S. Cl.
CPC ....... *H04B 7/18519* (2013.01); *H04B 7/0678* (2013.01); *H04W 56/001* (2013.01); *H04W 72/0446* (2013.01)

(58) Field of Classification Search
CPC ............. H04B 7/18519; H04B 7/0678; H04W 56/001; H04W 72/0446
See application file for complete search history.

(56) References Cited

U.S. PATENT DOCUMENTS

2012/0264371 A1   10/2012   Kim et al.
2015/0078250 A1*  3/2015   Mineta .................... H04J 13/12
                                                    370/320
2016/0242136 A1   8/2016   Jung

FOREIGN PATENT DOCUMENTS

CN    104062895 A    9/2014
CN    104316938 A    1/2015
(Continued)

*Primary Examiner* — Eugene Yun
(74) *Attorney, Agent, or Firm* — Bayramoglu Law Offices LLC

(57) ABSTRACT

A method for quasi-synchronous code division multiple access based on synchronization clock by piloting can make CDMA operate in quasi-synchronous conditions, so it is suitable for open wireless channels with relay nodes, such as satellite communication systems, and open wireless channels without relay nodes. The method includes: adopting a mode of CDMA spread spectrum transmission to share power resources to transmit signals at multiple transmitting stations in open wireless channels; adopting an external pilot signal to provide synchronization clock for the CDMA signals transmitted by multiple terminal stations in the open wireless channels, eliminating path delay differences from (Continued)

the multiple terminal stations to a relay node or receiving station, and making multi-channel CDMA signals received at the relay node or receiving station clock synchronized and phase aligned. The method can realize the quasi-synchronous reception of multi-channel CDMA signals.

8 Claims, 3 Drawing Sheets

(51) Int. Cl.
*H04W 56/00* (2009.01)
*H04W 72/0446* (2023.01)

(56) References Cited

FOREIGN PATENT DOCUMENTS

| | | |
|---|---|---|
| CN | 104584456 A | 4/2015 |
| CN | 110493864 A | 11/2019 |

* cited by examiner the proportion of power of the pilot signal to the total power of the pilot frequency bands is 0.1‰~5%; spreading with a spread spectrum code and superimposing on a communication signal in the pilot frequency bands in a low power spectrum signal mode similar with noise when the pilot signal is transmitted; wherein the influence on the received signal-to-noise ratio of the receiving end signal is lower than that on the local thermal noise of the receiving end

↓

Transmitting the pilot signal at the transmitting end

FIG. 3

| Header | Pilot | ID | Data Frame |
|---|---|---|---|

FIG. 4

METHOD FOR QUASI-SYNCHRONOUS CODE DIVISION MULTIPLE ACCESS BASED ON SYNCHRONIZATION CLOCK BY PILOTING

CROSS REFERENCE TO THE RELATED APPLICATIONS

This application is the national phase entry of International Application No. PCT/CN2020/105101, filed on Jul. 28, 2020, which is based upon and claims priority to Chinese Patent Application No. 201910696823.5, filed on Jul. 30, 2019, the entire contents of which are incorporated herein by reference.

TECHNICAL FIELD

The invention relates to the technical field of wireless communication, in particular to a method for quasi-synchronous code division multiple access based on synchronization clock by piloting.

BACKGROUND

In the access mode of CDMA (Code Division Multiple Access) different users are allocated different spread spectrum address codes to realize satellite resource sharing. CDMA users occupy the same frequency and transmit at the same time. Users are distinguished by the orthogonality of codes. Compared with FDMA (Frequency Division Multiple Access), the technology of CDMA is relatively complex and is mostly used in star networking.

The technology of CDMA has been adopted by the second generation (IS-95) and the third generation (CDMA2000) communication standards, and has become one of the mainstream communication systems. At the same time, the technology of CDMA is also widely used in military communication because of its anti-interference, good confidentiality, and low transmission signal power. Compared with FDMA and TDMA, CDMA has an advantage of soft channel capacity. The communication system adopting FDMA and TDMA (Time Division Multiple Access) cannot meet the communication needs of other users when the number of users is more than the number of frequency bands and time slots. Therefore, TDMA and FDMA have the limit of hard channel capacity. The technology of CDMA can utilize multi-user detection to improve user capacity.

The multiple access multiplexing technology of CDMA has been widely used in satellite communication backward link. Firstly, the transmission power of CDMA is lower than that of TDMA and FDMA, so it has good confidentiality. Secondly, as mentioned above, CDMA has the advantage of soft channel capacity compared with FDMA and TDMA, and can meet the communication needs of more users by an effective multi-user detection technology. Thirdly, CDMA can resist narrowband interference. Finally, CDMA can reduce EIRP value of backward transmission and avoid interference to adjacent satellites, especially meeting the communication requirements of a satellite communication system of "mobile communication". Therefore, whether a wireless communication system or satellite communication system, CDMA has a wide application prospect.

In DS-CDMA (Direct Sequence-Code Division Multiple Access), the symbols of each user are modulated by a group of orthogonal waveforms. Each user is assigned a waveform orthogonal to that of other users. FIG. 1 shows the system model of DS-CDMA. In principle, DS-CDMA is a wideband spread spectrum signal obtained by multiplying a narrowband signal carrying information by a high-speed address code signal. A receiving end needs to use the same address code signal synchronized with a transmitting end to control a carrier frequency phase of an input frequency converter to realize despreading. DS-CDMA has the advantages of anti narrowband interference, anti multipath fading and good confidentiality. Other advantages of DS-CDMA are: many users can share frequency resources without complex frequency allocation and management; it has the characteristic of "soft capacity", that is, the increase of the number of users within a certain limit will only reduce the signal-to-noise ratio without terminating the communication, which means DS-CDMA has no absolute capacity limit.

However, due to the strict synchronization of traditional CDMA, it is difficult to be directly applied to geosynchronous satellite communication.

An operation period of a geostationary satellite is equal to the rotation period of the earth. If the eccentricity and inclination of the orbit are zero, that is, the position of the track of subsatellite point remains unchanged. From any point on the earth, the satellite is stationary. This orbit is called a geostationary orbit. For the geosynchronous circular orbit with non-zero inclination, its track of subsatellite point is an "8" shape, and the highest latitude of the North-South latitude overflew by the satellite is equal to its orbit inclination. If the satellite operation is affected by perturbation, the track of subsatellite point will present a distorted "8" shape. This makes a ground station need to track the elevation of the satellite in real time, and overcome the problem of inaccurate synchronization.

SUMMARY

In order to overcome the defects of the prior art, the technical problem to be solved by the invention is to provide a method for quasi-synchronous code division multiple access based on synchronization clock by piloting. It can make CDMA operate in quasi-synchronous conditions, so it is suitable for open wireless channels with relay nodes, such as satellite communication systems, and open wireless channels without relay nodes.

The technical scheme of the invention is as follows.

This method for quasi-synchronous code division multiple access based on synchronization clock by piloting, comprises:

adopting a mode of CDMA spread spectrum transmission to share power resources to transmit signals at multiple transmitting stations in open wireless channels;

adopting an external pilot signal to provide synchronization clock for the CDMA signals transmitted by multiple terminal stations in the open wireless channels, eliminating path delay differences from the multiple terminal stations to a relay node or receiving station, and making multi-channel CDMA signals received at the relay node or receiving station clock synchronized and phase aligned, so as to realize the quasi-synchronous reception of multi-channel CDMA signals.

In the invention adopting a mode of CDMA spread spectrum transmission to share power resources to transmit signals at multiple transmitting stations in open wireless channels; adopting an external pilot signal to provide synchronization clock for the CDMA signals transmitted by multiple terminal stations in the open wireless channels, eliminating path delay differences from the multiple terminal stations to a relay node or receiving station, and making multi-channel CDMA signals received at the relay node or receiving station clock synchronized and phase aligned, so as to realize the quasi-synchronous reception of multi-channel CDMA signals. Therefore, it can make CDMA operate in quasi-synchronous conditions, so it is suitable for open wireless channels with relay nodes, such as satellite communication systems, and open wireless channels without relay nodes.

BRIEF DESCRIPTION OF THE DRAWINGS

FIG. 3 is a flowchart showing how to acquire a pilot signal.

FIG. 4 is a schematic diagram showing a structure of a pilot frame according to a preferred embodiment of the present invention.

DETAILED DESCRIPTION OF THE EMBODIMENTS

Figure 1:
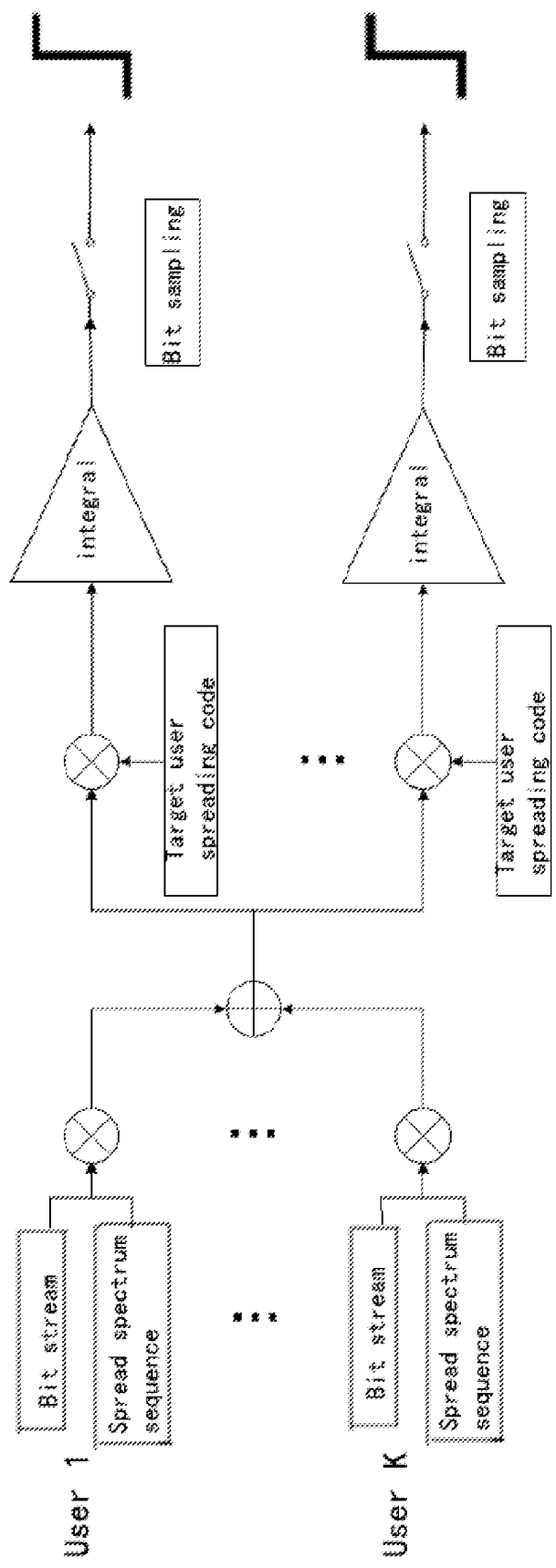
FIG. 1 is a schematic diagram showing the system model of DS-CDMA.
Figure 2:
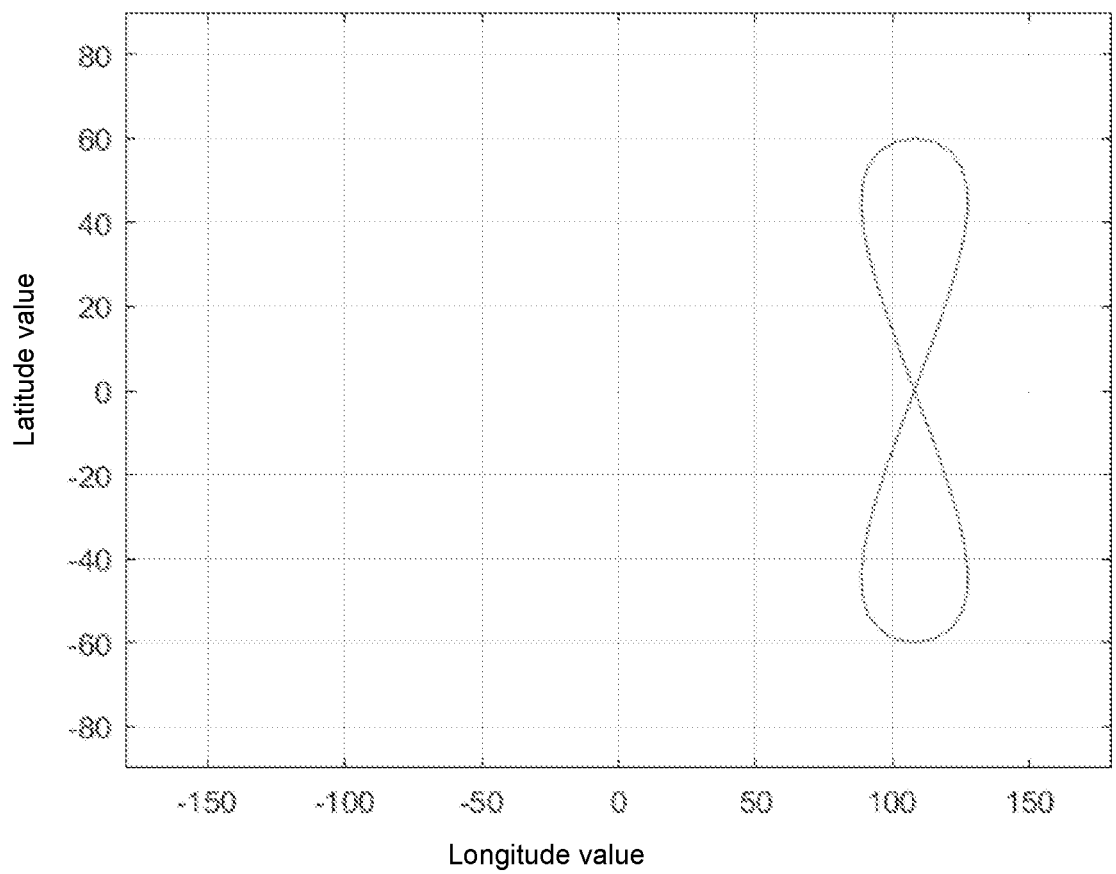
FIG. 2 is a schematic diagram showing a track of sub-satellite point in a non geosynchronous satellite.

This method for quasi-synchronous code division multiple access based on synchronization clock by piloting, comprises:

adopting a mode of CDMA spread spectrum transmission to share power resources to transmit signals at multiple transmitting stations in open wireless channels;

adopting an external pilot signal to provide synchronization clock for the CDMA signals transmitted by multiple terminal stations in the open wireless channels, eliminating path delay differences from the multiple terminal stations to a relay node or receiving station, and making multi-channel CDMA signals received at the relay node or receiving station clock synchronized and phase aligned, so as to realize the quasi-synchronous reception of multi-channel CDMA signals, that is Quasi-Synchronized Code Division Multiple Access.

In the invention adopting a mode of CDMA spread spectrum transmission to share power resources to transmit signals at multiple transmitting stations in open wireless channels; adopting an external pilot signal to provide synchronization clock for the CDMA signals transmitted by multiple terminal stations in the open wireless channels, eliminating path delay differences from the multiple terminal stations to a relay node or receiving station, and making multi-channel CDMA signals received at the relay node or receiving station clock synchronized and phase aligned, so as to realize the quasi-synchronous reception of multi-channel CDMA signals. Therefore, it can make CDMA operate in quasi-synchronous conditions, so it is suitable for geosynchronous satellite communication.

Preferably, the external pilot signal comprises stable and continuous synchronization clock information and continuous reference timing information. Receiving the external pilot signal ensures that multiple terminal stations in the system realize clock quasi-synchronization based on an external clock and establish a time reference.

Further, the method further comprises:

self-transmitting and self-receiving a probe frame by the relay node at each terminal station if there is a relay node in the open wireless channels and the position or track of the relay node is known; measuring the absolute distance between the terminal station and the relay node; performing phase compensation for the distance difference of multiple terminal stations transmitting CDMA signals relative to the relay node to make the transmitted multi-channel CDMA signals realize phase alignment when reaching the relay node; realizing the clock and phase alignment based on the external pilot signal by combining with the clock quasi-synchronization based on the external pilot signal, so as to ensure the quasi-synchronous combination of multi-channel CDMA signals at the relay node and realize quasi-synchronous reception at the receiving terminal station.

Alternatively, the method further comprises:

transmitting a test frame to a receiving terminal station respectively at multiple transmitting terminal stations on the basis of realizing clock quasi-synchronization by the external pilot signal, receiving the test response responded by the receiving terminal station, and measuring the distance between each transmitting terminal station and the receiving terminal station, if there is no relay node in the open wireless channels and multiple terminal stations transmit CDMA signals to the same terminal station; performing phase compensation for the distance difference of multiple terminal stations transmitting CDMA signals relative to the corresponding receiving terminal stations to make the transmitted multi-channel CDMA signals realize phase alignment when reaching the receiving terminal stations; and realizing the clock and phase alignment based on the external pilot signal by combining with the clock quasi-synchronization based on the external pilot signal, so as to ensure the quasi-synchronous combination of multi-channel CDMA signals at the receiving terminal stations.

Preferably, the method further comprises:

maintaining the synchronization clock by continuously or intermittently receiving the external pilot signal after realizing the clock quasi-synchronization based on the external pilot signal; transmitting periodically the probe frame to the relay node or receiving terminal station at the transmitting terminal station due to the change of the distance from the transmitting terminal station to the relay node or receiving terminal station accumulated with time; re-measuring the distance and resetting the phase to realize phase alignment. The performance of quasi-synchronous CDMA depends on the accuracy of aligned phase and synchronization clock, which corresponding to the change of relative position between the transmitting terminal station and the relay node or receiving terminal station within the time of ranging cycle.

Further, in order to ensure the performance of quasi-synchronous reception in CDMA, the phase alignment accuracy is less than ¼ of the spread spectrum chip width.

Further, Global Positioning System (GPS) and BeiDou Navigation Satellite System (BeiDou) are external pilot signal sources used to support CDMA quasi-synchronous reception. GPS/BeiDou system can provide an accurate synchronization clock for terminal stations and geographic location information of each terminal station. If there is no relay node in the channel, the distances between transmitting terminal stations and receiving terminal stations of multiple CDMA signals are measured directly, and the distance differences are compensated at the transmitting ends to realize the quasi-synchronous reception of multiple CDMA signals by the receiving terminal station. If there is a relay node in the channel, after knowing the location or track information of the relay node, measure the distance between the transmitting terminal station and the relay node, compensate the distance difference between the transmitting end of multi-channel CDMA and the relay node, realize the quasi-synchronous combination of multi-channel CDMA signals at the relay node, and further realize the quasi-synchronous reception of multi-channel CDMA signals at the receiving end. The effect of CDMA signal phase alignment depends on the clock accuracy and positioning accuracy of GPS/BeiDou signal.

Further, as shown in FIG. 3, the method further comprises the following steps to obtain a reference clock by the pilot signal:

selecting a terminal station as a reference in open wireless channels, and transmitting a pilot signal; occupying all or some frequency bands of open wireless channels to transmit the pilot signal; wherein all or some frequency bands of open wireless channels occupied by the pilot signal are pilot bands, and the proportion of power of the pilot signal to the total power of the pilot frequency bands is 0.1%0-5%; spreading with a spread spectrum code and superimposing on a communication signal in the pilot frequency bands in a low power spectrum signal mode similar with noise when the pilot signal is transmitted, wherein the influence on the received signal-to-noise ratio of the receiving end signal is lower than that on the local thermal noise of the receiving end;

wherein the pilot signal provides pilot, carrier wave and synchronization clock, standard timing and indication information for network construction and mutual communication of multiple types of terminal stations in channels.

Further, as shown in FIG. 4, the pilot signal comprises a frame header, a frame number and an indication information data body;

the frame header comprises a synchronization header and a pilot; wherein the synchronization header is configured for timing of a pilot signal frame and recovery of a carrier wave, and the pilot is configured for eliminating frequency offset of the pilot signal frame;

the frame number is configured for identifying a cyclic sequence of the pilot signal frame;

the indication information data body is configured for carrying indication information for indicating channel, network state and management information;

the method further comprises:

demodulating and receiving the pilot signal, extracting the carrier and clock information at each terminal station; obtaining the reference clock by the period of the fixed signal frame and the identification frame number in the signal frame; identifying a reference station transmitting pilot information according to the indication information in the pilot signal, and completing reception of other indication information.

Preferably, the synchronization is in the range of $\frac{1}{2}$-$\frac{1}{32}$ time slot. Wherein, the effect of $\frac{1}{32}$ time slot is optimum, which can make CDMA run in close to synchronous state.

Specifically, for the signal transmitted by the transmitting station, the length of each frame is fixed, the information rate of each frame is fixed, so the length of the time represented by each frame is also fixed. Therefore, the receiving station can determine a time interval by an interval between the signal frames of the transmitted signal by the transmitting terminal station. The interval between signal frames is taken as the basic unit of clock, and the time calibration is completed by the time difference between frames with different frame numbers. If the time interval count between the front and rear frame is not equal to the period of signal frames, the clock of the receiving station needs to be adjusted.

The ground receiving station continuously receives the pilot signal, and can distinguish each frame in the received pilot signal according to the frame structure. As the pilot signal, the length of each frame is fixed, the information rate of each frame is fixed, so the time represented by each frame is also fixed. Therefore, the ground receiving station can determine the time interval by the interval between the pilot signal frames. The interval between signal frames (i.e., signal frame period) is taken as the basic unit of clock, and the time calibration is completed by the time difference between frames with different frame numbers. If the time interval count between the front and rear frame is not equal to the period of pilot signal frames, the clock of the ground receiving station needs to be adjusted.

Further, the period of the signal frame is in the range of 50 ms-250 ms. When the period of the signal frame is an integral multiple of 50 ms, such as 50 ms, 100 ms, 150 ms, 200 ms and 250 ms, it is optimum as the basic unit of clock and calibration.

When the transmitting end of the pilot signal is a satellite, the method further comprises:

superimposing a pilot signal on each data signal carrier wave of the satellite and broadcasting by the satellite; performing spread spectrum communication for the pilot signal by spread spectrum code, and the power is 1‰-1% of the power of the communication satellite transponder;

monitoring the satellite pilot signal and completing the synchronization clock between the user receiving station and the satellite clock by receiving the pilot signal at the user receiving station in the network.

When the transmitting end of the pilot signal is a management center station in earth stations, the method further comprises:

superimposing a pilot signal on each data signal carrier wave of an earth station as a signal transmitting end;

demodulating and receiving the pilot signal at an earth station as a signal receiving end, extracting information of the carrier wave, and identifying the earth station as the signal transmitting end;

performing spread spectrum communication for the pilot signal by spread spectrum code, and the power is 0.1‰-5% of the power of the communication satellite transponder.

Specifically, the pilot signal comprises: a frame header, a frame number and an indication information data body. FIG. 4 is a schematic diagram showing a structure of a pilot frame according to a preferred embodiment of the present invention.

Further, the frame header is configured for timing of a pilot signal frame and recovery of a carrier wave, whose length is in the range of 16-128 bits. The pilot part is all 0 part, and its length is more than 60 bits. It is configured for eliminating frequency offset of the pilot signal frame. The length of the frame number field is more than 8 bits, which is configured for measuring the absolute distance of the earth station. The data body carries network management information and is configured for managing and maintaining satellite network information with other stations in the network. The length is in the range of 256-1008 bits.

Further, OVSF code (Orthogonal Variable Spreading Factor. OVSF code is mainly configured for orthogonal spread spectrum. The length of OVSF code used varies with the rate of service channel) is configured for distinguishing between channel and spread rate. The reason for using OVSF code is that it has orthogonality and variable length.

Further, the spread spectrum sequence adopts OVSF code. This brings support for variable rates.

Further, the pilot signal is circularly modulated by Binary Phase Shift Keying and continuously transmitted; each user station is equipped with a pilot signal receiver. The pilot signal receiver despreads the pilot signal, and then directly receives it to obtain the signal frame of the pilot signal. The information bit is determined by the frame header, and the pilot signal is continuously received to complete clock quasi-synchronization. Since the frame length and time of GDP are fixed, the clock quasi-synchronization can be completed by continuously receiving GDP.

Wherein, for a large signal (the signal whose power is more than half of the power of the whole transponder is regarded as the large signal), the reception is completed by rearranging the frame header of the TDMA frame, the large signal is eliminated to obtain the mixed signal of small signals (the signal whose power is less than 10% of the power of the whole transponder is regarded as the small signal), and then the orthogonal OVSF code is configured for despreading the mixed signal of small signals, so as to complete the reception.

Wherein, for a medium signal (the signal whose power is 10%-50% of the power of the whole repeater is regarded as the medium signal), due to the orthogonality of OVSF code, the corresponding spread spectrum code can be directly configured for completing the despreading reception, so as to obtain the target signal.

Preferably, the period of the signal frame is in the range of 50 ms-250 ms.

When the period of the signal frame is an integral multiple of 50 ms, such as 50 ms, 100 ms, 150 ms, 200 ms and 250 ms, it is optimum as the basic unit of clock and calibration.

Preferably, the change of the absolute distance between the satellite and the earth station is obtained by the phase difference between the transmitting end and the receiving end.

In the process that a management center station continuously transmits a pilot signal, a synchronous satellite keeps moving around the earth, showing an "8" track relative to a subsatellite point. Therefore, the distance between the satellite and the management center station changes continuously, resulting in continuous change of a path delay of the pilot signal. However, the movement of the satellite shows a certain regularity, which changes from far to near and then from near to far. Therefore, the change of the path delay also shows a certain regularity.

For the management center station, by self-receiving a pilot signal, the change of a link path delay transmitted to the satellite is consistent with that of a link path delay received from the satellite signal. Therefore, the phase delay between a receiving end and transmitting end of the pilot signal is equivalent to double the change of a satellite to ground path delay. Therefore, when a receiver of spread spectrum communication detects that the maximum correlation peak is moving in a certain direction, a phase delay can be obtained while tracking the maximum correlation peak. Half of the phase delay is the path delay. The change of absolute distances between the satellite and the reference station can be obtained by multiplying the path delay by the speed of light.

Preferably, satellite ranging is realized by the change of the rough absolute distance between satellite ground stations and the fine absolute distance between satellite ground stations.

By the pilot signal, the absolute time of the management center station transmitting the frame with the specific frame number and receiving the frame with the specific frame number can be used to make a difference to obtain the absolute path delay between the satellite ground stations, which can be multiplied by the speed of light to obtain the value of the satellite ground absolute distance. However, because the path delay of satellite communication is about 280 ms, the absolute distance sampling is less in a period of time, and it is impossible to complete very accurate satellite ranging.

However, the absolute distance can be supplemented by adding the change of absolute distance, which is measured with the movement of the maximum correlation peak of the spread spectrum receiver, because the number of samples is huge in a period of time. Between the two absolute distances, the absolute distance at the intermediate time point can be predicted by the change value of absolute distance, so as to complete high-precision satellite ranging.

Preferably, the pilot signal is circularly modulated by Binary Phase Shift Keying and continuously transmitted. In this way, all earth stations in the network can receive the pilot signal.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A method for quasi-synchronous code division multiple access (CDMA) based on a synchronization clock by piloting, comprising:
    adopting a mode of CDMA spread spectrum transmission to share power resources to transmit signals at multiple transmitting stations in open wireless channels;
    adopting an external pilot signal to provide the synchronization clock for CDMA signals transmitted by multiple terminal stations in the open wireless channels, wherein the external pilot signal comprises stable and continuous synchronization clock information and continuous reference timing information;
    eliminating path delay differences from the multiple terminal stations to a relay node or a receiving terminal station; and
    making multi-channel CDMA signals received at the relay node or the receiving terminal station realize a clock synchronization and a phase alignment, so as to realize a quasi-synchronous reception of the multi-channel CDMA signals;
    receiving the external pilot signal to ensure that the multiple terminal stations in a system realize a clock quasi-synchronization based on an external clock and establish a time reference;
    self-transmitting and self-receiving a probe frame by the relay node at each of the multiple terminal stations if there is the relay node in the open wireless channels and a position or a track of the relay node is known;
    measuring an absolute distance between the each of the multiple terminal stations and the relay node;
    performing phase compensation for a distance difference of the multiple terminal stations transmitting the CDMA signals relative to the relay node to make transmitted multi-channel CDMA signals realize a phase alignment when reaching the relay node; and
    realizing the clock synchronization and the phase alignment based on the external pilot signal by combining with the clock quasi-synchronization based on the external pilot signal, so as to ensure a quasi-synchronous combination of the transmitted multi-channel CDMA signals at the relay node and realize the quasi-synchronous reception at the receiving terminal station.

2. A method for quasi-synchronous code division multiple access (CDMA) based on a synchronization clock by piloting, comprising:

adopting a mode of CDMA spread spectrum transmission to share power resources to transmit signals at multiple transmitting stations in open wireless channels;

adopting an external pilot signal to provide the synchronization clock for CDMA signals transmitted by multiple terminal stations in the open wireless channels, wherein the external pilot signal comprises stable and continuous synchronization clock information and continuous reference timing information;

eliminating path delay differences from the multiple terminal stations to a relay node or a receiving terminal station;

making multi-channel CDMA signals received at the relay node or the receiving terminal station realize a clock synchronization and a phase alignment, so as to realize a quasi-synchronous reception of the multi-channel CDMA signals;

receiving the external pilot signal to ensure that the multiple terminal stations in a system realize a clock quasi-synchronization based on an external clock and establish a time reference;

transmitting a test frame to a receiving terminal station respectively at multiple transmitting terminal stations on a basis of realizing the clock quasi-synchronization by the external pilot signal;

receiving a test response responded by the receiving terminal station;

measuring a distance between each of the transmitting terminal stations and the receiving terminal station, if there is no relay node in the open wireless channels and the multiple terminal stations transmit the CDMA signals to the same terminal station;

performing phase compensation for a distance difference of the multiple terminal stations transmitting the CDMA signals relative to corresponding receiving terminal stations to make transmitted multi-channel CDMA signals realize the phase alignment when reaching the corresponding receiving terminal stations; and realizing the clock synchronization and the phase alignment based on the external pilot signal by combining with the clock quasi-synchronization based on the external pilot signal, so as to ensure a quasi-synchronous combination of the transmitted multi-channel CDMA signals at the receiving terminal stations.

3. The method according to claim 2, further comprising:

maintaining the synchronization clock by continuously or intermittently receiving the external pilot signal after realizing the clock quasi-synchronization based on the external pilot signal;

transmitting periodically the probe frame to the relay node or the receiving terminal station at the transmitting terminal stations due to a change of a distance accumulated with time between the transmitting terminal stations and the relay node, or between the transmitting terminal stations and the receiving terminal station; and re-measuring the distance and resetting a phase to realize the phase alignment.

4. A method for quasi-synchronous code division multiple access (CDMA) based on a synchronization clock by piloting, comprising:

adopting a mode of CDMA spread spectrum transmission to share power resources to transmit signals at multiple transmitting stations in open wireless channels;

adopting an external pilot signal to provide the synchronization clock for CDMA signals transmitted by multiple terminal stations in the open wireless channels;

eliminating path delay differences from the multiple terminal stations to a relay node or a receiving terminal station;

making multi-channel CDMA signals received at the relay node or the receiving terminal station realize a clock synchronization and a phase alignment, so as to realize a quasi-synchronous reception of the multi-channel CDMA signals;

maintaining the synchronization clock by continuously or intermittently receiving the external pilot signal after realizing a clock quasi-synchronization based on the external pilot signal;

transmitting periodically a probe frame to the relay node or a receiving terminal station at the transmitting terminal stations due to a change of distances accumulated with time between the transmitting terminal stations and the relay node, or between the transmitting terminal stations and the receiving terminal station; and re-measuring the distance and resetting a phase to realize the phase alignment.

5. The method according to claim 4, wherein accuracy of the phase alignment is less than ¼ of a spread spectrum chip width in order to ensure performance of quasi-synchronous reception in CDMA.

6. The method according to claim 5, wherein a navigation satellite system is an external pilot signal source used to support the quasi-synchronous reception in the CDMA;

wherein the GPS navigation satellite system provides accurate synchronization clock for the multiple terminal stations and provides geographic location information of each of the multiple terminal stations;

wherein the method further comprises:

measuring directly the distances between the transmitting terminal stations and the receiving terminal station of the multi-channel CDMA signals if there is no relay node in the open wireless channels, and compensating distance differences at transmitting ends to realize the quasi-synchronous reception of the multi-channel CDMA signals by the receiving terminal station; and measuring the distances between the transmitting terminal stations and the relay node after knowing a location or track information of the relay node if there is a relay node in the open wireless channels, and compensating a distance difference between the transmitting ends of the multi-channel CDMA signals and the relay node, so as to realize a quasi-synchronous combination of the multi-channel CDMA signals at the relay node, and further realize the quasi-synchronous reception of the multi-channel CDMA signals at the a receiving end.

7. The method according to claim 5, a reference clock is obtained by a pilot signal; the pilot signal is obtained by the following:

selecting a terminal station as a reference in the open wireless channels, and transmitting the pilot signal;

occupying all or some frequency bands of the open wireless channels to transmit the pilot signal, wherein the all or some frequency bands of the open wireless channels occupied by the pilot signal are pilot frequency bands, and a proportion of power of the pilot signal to a total power of the pilot frequency bands is 0.1%-5%;

spreading with a spread spectrum code and superimposing on a communication signal in the pilot frequency bands in a low power spectrum signal mode similar with noise when the pilot signal is transmitted, wherein an influence on a received signal-to-noise ratio of a signal at a receiving end is lower than the influence on a local thermal noise of the receiving end, wherein the pilot signal provides a pilot, a carrier wave, the synchronization clock, standard timing, and indication information for network construction and mutual communication of multiple types of terminal stations in the open wireless channels.

8. The method according to claim 7, wherein the pilot signal comprises a frame header, a frame number, and an indication information data body;

the frame header comprises a synchronization header and the pilot, wherein the synchronization header is configured for timing of a pilot signal frame and recovery of the carrier wave, and the pilot is configured for eliminating a frequency offset of the pilot signal frame;

the frame number is configured for identifying a cyclic sequence of the pilot signal frame;

the indication information data body is configured for carrying indication information for indicating channel, network state, and management information;

demodulating and receiving the pilot signal, extracting the wave carrier and clock information at each of the multiple terminal stations;

obtaining the reference clock by a period of a fixed signal frame and the frame number in the fixed signal frame; identifying a reference station transmitting pilot information according to the indication information in the pilot signal, and completing reception of other indication information.

* * * * *